J. H. REID.
MEANS FOR PROMOTING THE DISCHARGE OF MOLTEN PRODUCTS FROM A FURNACE OR OTHER APPARATUS.
APPLICATION FILED DEC. 28, 1914.
1,227,067.
Patented May 22, 1917.
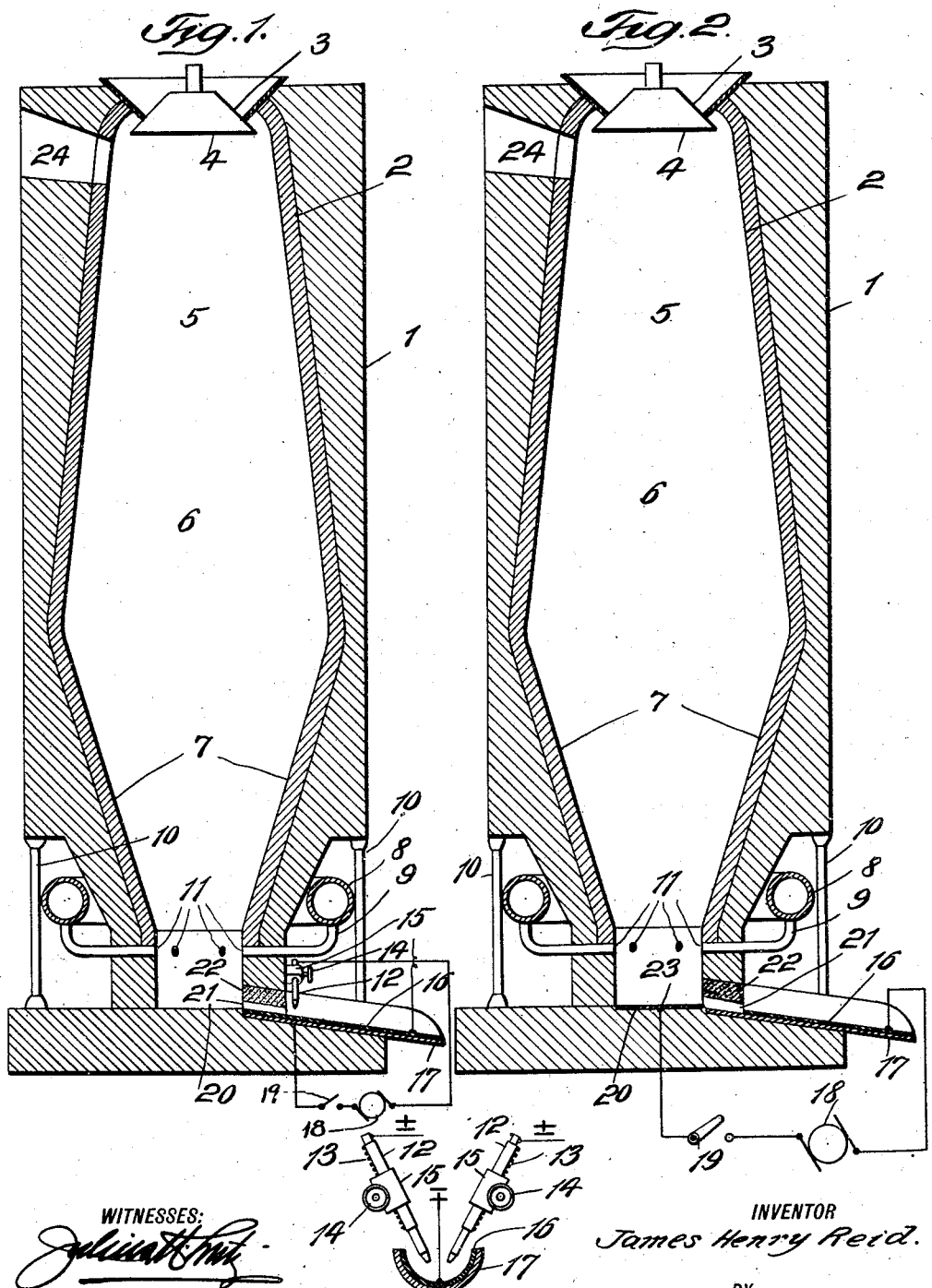
WITNESSES:
INVENTOR
James Henry Reid.
BY
Henry S. Blackmore.
ATTORNEY

UNITED STATES PATENT OFFICE.

JAMES HENRY REID, OF NEWARK, NEW JERSEY, ASSIGNOR TO PATENTS PROCESS COMPANY, A CORPORATION OF MAINE.

MEANS FOR PROMOTING THE DISCHARGE OF MOLTEN PRODUCTS FROM A FURNACE OR OTHER APPARATUS.

1,227,067.

Specification of Letters Patent. Patented May 22, 1917.

Application filed December 28, 1914. Serial No. 879,246.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Means for Promoting the Discharge of Molten Products from a Furnace or other Apparatus, of which the following is a specification.

This invention relates to devices and means for maintaining, promoting, or augmenting fusion of fusible substances at the discharge or tap-hole of a furnace or other apparatus, and has for its object the facilitation of free discharge from the furnace or apparatus of such substances as chill quickly or are of sluggish flow, such as slags, carbids, or other substances, which are prone to clog up the outlet or discharge opening, and comprises the combination with a furnace or fusion apparatus of a means situated or located within operative distance of or operating through, the tap-hole or discharge duct whereby the material flowing therefrom is augmented or its fusion promoted or maintained in a fused or molten condition by supplemental action of a heat delivering means, such as oxyacetylene flame from a burner or through the action of electricity directly or indirectly in combination or conjunction with the furnace.

As an illustration of the invention and manner whereby its operation is performed, the combination of electrical means for maintaining fusion of the discharge fused or molten material from a blast furnace will be taken as an example, reference being directed to the accompanying drawing which illustrates one form of adaptation or application of the invention in which, Figure 1 represents a vertical section of a blast furnace showing in combination electrical means for maintaining, promoting or augmenting fusion of discharging substances, by vertically disposed electrodes adapted to act through the flowing material between them and an opposite electrode situated in the trough of the furnace, Fig. 2 is a similar view showing horizontal means for disposing the electrical current through the flowing material or through the discharge duct between electrodes situated in the outer trough and the inner part of the furnace such as the hearth, and, Fig. 3 shows a detail of the vertical electrodes and the electrode situated in the trough of the furnace, and means for regulating and adjusting the electrodes in the fore-hearth as shown in Fig. 1.

Similar numerals of reference represent corresponding parts in the various views.

Referring to the drawing the numeral 1 represents a furnace wall or body provided with the lining 2. The upper part of the furnace is provided with the charge gallery 3 and the feed and control device 4. The interior of the furnace is so constructed as to provide spheres or zones of various diameter whereby the reduction, transformation, or preparation of the material to be operated on is treated, comprising the throat 5, the body of the furnace 6, the boshes 7, and the twyers 11. The furnace is also provided with the blast main 8 communicating with the twyers through the air conduit 9, and is also provided with the tap-hole 21 and filler 22, and also with the outlet 24 at its upper end. The wall of the furnace is supported on the pillars 10 which act as supports therefor, and the inner lower portion of the furnace is provided with a hearth 20 from which the tap-hole extends and communicates with the trough 17, which trough is provided with an electrically conductive lining constituting an electrical terminus or an electrode, when communicating with a generator 18 through suitable electrical connections with opposite electrodes 12 which are provided with means 13 whereby they may be adjusted as to position and distance by means of the cogged feed 14 the revolution of which causes the electrode to advance or recede through the sleeve guideway 15.

The tap-hole 21 of the furnace is regulated in size by the filler 22 in accordance with the character of material to be made or employed. In Fig. 1 is shown vertical arcing means for maintaining or promoting fusion or heating of the discharging material in which the electrodes 12 supply the current to the opposite electrode 16 situated in the trough 17. The electrodes are adjustable and regulatable by the feed device 13 and 14 through the sleeve 15, which device is more particularly shown in detail in Fig. 3. The electrical current is supplied by a suitable generator such as shown at 18 Fig. 2 and controlled by switch 19.

In Fig. 2 the heating device constitutes an electrode situated on the floor or hearth of the furnace 20 which electrode is indicated by the numeral 23 and an opposite electrode 16 in the trough 17 so that the current passes through the molten material passing out of the furnace through the tap-hole 21 and heats the same by electrical resistance to the current passing through it between the interior electrode 23 and the exterior electrode 16 thereby promoting the fusion and maintaining the material in a free flowing condition.

The form of furnace illustrated and described viz. a blast furnace, is shown merely to illustrate how an invention including the device for maintaining, promoting or augmenting the fusion of the material at the point of discharge may be combined forming a new construction capable of accomplishing new and useful results in overcoming the choking of the discharge by chilling or freezing of the product, but any type of furnace or apparatus may be employed, and any form or character of supplemental heater situated in operative relation to the tap-hole to promote fusion may be employed in the combination so long as there remains a unity of members and combination of parts capable of co-acting or coöperating in such a manner as will augment or promote fusion and maintenance thereof of discharging material at the point of discharge or within operative distances thereof broadly, and by heat generated by combustion or augmented by electrical heating devices.

The electrodes as shown in Fig. 3 are not only adjustable in an upward and downward direction but can be moved inward and outward toward or from the tap-hole or from the left to right approaching or withdrawing from each other on pivoted or swiveled joints so that these electrodes 12 may be adjusted with reference to each other and the opposite electrode 16 at any suitable or desirable position to fuse and remove accumulating solidified substances from the trough or directed toward the tap-hole to maintain the same sufficiently heated to prevent choking by solidification through chilling or otherwise of the fused material desired to be discharged.

The products of combustion or other volatile or gaseous products or by-products driven off during the operation of the furnace are discharged through the outlet 24 at the upper part of the furnace into a flue, condenser, or other receptacle or conduit. A blast of air to support combustion when combustion heat is desired is introduced through the twyers 11 as desired and the fused material formed or produced accumulates on the hearth 20 from which it may be withdrawn from time to time through the tap-hole 21 by removing a plug therefrom.

The heating of the material being discharged from the apparatus may be accomplished by any suitable means in combination with the furnace or apparatus located or situated within heat delivering or forming distance of the tap-hole or discharge duct, either by combustion such as an oxy-acetylene burner or specifically by electricity as herein specifically claimed, and the electricity employed may be of any suitable kind or character capable of accomplishing the desired results and employed or implied in any suitable way either by arc, resistance or other manner.

Having now described my invention what I claim as new and desire to secure by Letters Patent is:—

1. In a furnace, the combination of a discharge duct forming a tap-hole thereof, a trough extending from said duct, an electrode situated within the furnace, another electrode situated in the trough exterior of the furnace, whereby the molten material in the tap-hole while flowing therethrough completes the electrical circuit.

2. In a furnace, the combination of a discharge duct forming a tap-hole thereof, a trough extending in a line of the duct, an electrode situated entirely within the furnace, and another electrode situated in the trough and exteriorly of the furnace wall, whereby the molten material in the tap-hole while flowing therethrough completes the electrical circuit.

3. In a furnace, the combination of a discharge duct forming a tap-hole thereof, a trough extending from said duct in a line therewith, opposite electrodes so disposed with reference to the tap-hole and the trough that an electrical circuit will be completed between the electrodes by means of molten material while flowing through the tap-hole.

In testimony whereof I affix my signature in presence of two witnesses.

JAMES HENRY REID.

Witnesses:
S. P. WITHERILL, Jr.,
PHILIP LOFF.